United States Patent [19]

Salyer et al.

[11] 3,923,757

[45] Dec. 2, 1975

[54] TRANSPARENT ADHESIVE

[75] Inventors: Ival O. Salyer; Philip H. Wilken, both of Dayton; George L. Ball, III, West Carrollton, all of Ohio

[73] Assignee: Monsanto Research Corporation, St. Louis, Mo.

[22] Filed: Oct. 18, 1973

[21] Appl. No.: 407,714

Related U.S. Application Data

[63] Continuation of Ser. No. 211,642, Dec. 23, 1971, abandoned.

[52] U.S. Cl........... 260/80.75; 161/183 B; 161/193; 260/87.3
[51] Int. Cl.$^2$ .................. B32B 27/36; B32B 17/06; C08F 15/10; C08F 15/40
[58] Field of Search......... 260/87.3, 91.3 VA, 80.75

[56] References Cited
UNITED STATES PATENTS

| | | | |
|---|---|---|---|
| 2,448,946 | 9/1948 | Alderson | 260/87.3 |
| 3,523,933 | 8/1970 | Inskip | 260/89.1 |
| 3,631,161 | 12/1971 | Fan | 260/94.9 GA |

Primary Examiner—Christopher A. Henderson
Attorney, Agent, or Firm—Bruce Stevens

[57] ABSTRACT

The extent of the usefulness of glass and polycarbonate in specialty windows depends on the properties of these two materials and the characteristics of transparent adhesives for the bonding of the polycarbonate and the glass. Accordingly, a transparent terpolymer is disclosed as an adhesive for bonding laminates with layers of polycarbonate and glass.

The adhesive comprises specific terpolymers of ethylene/vinyl acetate/vinyl alcohol, lightly crosslinked with a peroxide preferably to a level where the thermoplastic nature is maintained for laminating. Importantly excellent toughness and low temperature properties are provided by the terpolymer and these are maintained while the higher temperature properties are enhanced through the crosslinking.

2 Claims, No Drawings

TRANSPARENT ADHESIVE

This is a continuation, of application Ser. No. 211,642, filed Dec. 23, 1971, now abandoned.

Applications filed relating to similar subject matter are as follows: Ser. No. 211,625, filed Dec. 23, 1971, entitled "A Transparent Laminate of Polycarbonate and Glass"; Ser. No. 211,627, filed Dec. 23, 1971, entitled "Polycarbonate and Glass Laminate"; Ser. No. 211,626, filed Dec. 23, 1971, entitled "Improved Laminate"; and Ser. No. 211,643, filed Dec. 23, 1971, entitled "Polycarbonate and Glass Additives".

BACKGROUND OF THE INVENTION

1. Field of the Invention

The present invention is related to the field of adhesives for safety laminates used in vehicular, aircraft, armor, architectural, and other related applications. More particularly, it is related to adhesives for laminates of glass and polycarbonate sheet and the method of preparing the adhesives. The adhesive is a terpolymer of ethylene/vinyl acetate/vinyl alcohol lightly crosslinked with a peroxide.

2. Description of the Prior Art

Laminated safety glass has found wide acceptance for architectural applications and automobile windshields. Laminated safety glass comprises two or more glass sheets bonded with a tough plastic interlayer which is also an adhesive. The usual glass sheets are plate glass or tempered glass of varying thicknesses. The usual plastic interlayer is a plasticized polyvinyl acetal resin sheet with a thickness of about 0.015 inch or more. The energy absorption is achieved both through fracture of the glass and stretching of the interlayer.

Despite the advantages of bonded glass-glass laminates, there are certain advantages to using a laminate of polycarbonate and glass, particularly in such areas as aircraft windshields, armored windows, and for certain architectural applications, such as store fronts. An unsupported sheet of polycarbonate can provide higher orders of energy absorption than polyvinyl acetal. A laminate prepared from sheets of polycarbonate and glass thus have greater resistance to and integrity after impact.

Despite the advantages of polycarbonate-glass laminates for these applications, it has been difficult to prepare stable optically clear laminates of polycarbonate and glass, even though major improvements in glasses and polycarbonates have occurred in recent years. Acceptance has been poor because of the problems with the plastic adhesive which either attacks the polycarbonate rendering it nontransparent or because of poor stability, and/or processability. The present invention is directed toward a highly effective adhesive for these laminates.

The hydrolyzed ethylene/vinyl acetate polymer which is the basis of this invention is of significant commercial interest. Unlike polyvinyl alcohol, it is water insoluble and, at the same time, possesses the important advantageous properties of polyvinyl alcohol, such as strength, and resistance to organic solvents and the low temperature toughness of polyethylene. Hence, numerous processes have been devised for preparing the products with particular attention being given to methods of controlling the hydrolysis to obtain conversion of only part of the ester groups.

In industrial practice, the hydrolysis is generally conducted in a material which is a solvent for the unhydrolyzed copolymer (for example, an aromatic hydrocarbon such as toluene), and the hydrolysis product is then precipitated in a non-solvent (for example, methanol or water). The hydrolysis of the ethylene/vinyl acetate copolymer is generally effected by treating the copolymer with a suitable hydrolyzing agent, such as an alkali or strong organic acid. The Salyer U.S. Pat. No. 3,386,978 teaches that catalytic hydrolysis of ethylene/vinyl acetate copolymer can be readily controlled when operating in a medium comprising an inert liquid aromatic hydrocarbon in a mixture of ethanol and methanol, rather than a single alkanol.

A method of making partially hydrolyzed ethylene/vinyl ester polymers insoluble by crosslinking with a diacyl peroxide was shown by Alderson in U.S. Pat. No. 2,448,946, issued September 7, 1948. Alderson, however, teaches polymers derived from ethylene/vinyl esters having an ethylene/vinyl ester ratio greater than about 2.5 and which have been hydrolyzed to at least 25 percent. Further, his preferred materials are compounded with 5–10 weight percent of a diacyl peroxide. As will hereinafter become apparent, the compositions of Alderson are unsuitable for bonding glass to polycarbonate, glass-to-glass or polycarbonate-to-polycarbonate and, in particular, are not thermoplastic or transparent.

SUMMARY

Thus it is one object of this invention to prepare an adhesive for glass and polycarbonate laminates. It is another object to provide an optically clear adhesive for glass and polycarbonate laminates. It is another object to provide an adhesive for glass and polycarbonate laminates that will maintain their integrity when exposed to thermal cycling. It is another object of this invention to provide an adhesive for glass and polycarbonate laminates that will withstand impact.

These and other objects are obtained by an optically clear adhesive for glass-to-glass, glass-polycarbonate, and polycarbonate-polycarbonate laminates which comprises an ethylene/vinyl acetate copolymer partially hydrolyzed in an acid medium to a terpolymer of ethylene/vinyl acetate/vinyl alcohol compounded with from about 0.1 to about 5 weight percent of an organic peroxide. A particularly advantageous embodiment of this invention is an adhesive comprising an ethylene/vinyl acetate copolymer having from 45 to 55 weight percent vinyl acetate which has been partially hydrolyzed in an acid medium to about 4 to about 20 weight percent vinyl alcohol, said terpolymer being compounded and crosslinked with from about 0.1 to about 1.5 weight percent of an organic peroxide.

The initial unhydrolyzed ethylene/vinyl acetate copolymers to which this invention pertains can have a fairly wide range of ratios. Although the copolymers containing from about 45 to 55 weight percent vinyl acetate are desirable, it has been found that copolymers ranging from about 40 weight percent to about 65 weight percent vinyl acetate are satisfactory. At less than about 35 weight percent ethylene, the terpolymer loses some of its important physical characteristics, such as toughness and resistance to impact at low temperature. At greater than about 65 weight percent ethylene, the terpolymer loses much of its rubbery character due to ethylene crystallinity. These copolymers having a wide range of compositions have previously been made by other workers in the field.

The method of hydrolyzing the ethylene/vinyl ester to a terpolymer of ethylene/vinyl acetate/vinyl alcohol is critical. The hydrolysis of ethylene/vinyl acetate copolymers to give products in which a part, or all, of the acetate groups of the copolymer have been converted to hydroxyl radicals is generally effected by treating a solution of the copolymer with a suitable hydolyzing agent such as alkali or mineral acid. However, when attempts were made to react the terpolymer with a diacyl peroxide, such as dicumyl peroxide or benzoyl peroxide, to produce an optically clear adhesive for glass-polycarbonate laminates, the ethylene/vinyl acetate hydrolyzed in a basic medium would not react with the diacyl peroxide. When the basic hydrolyzed product was neutralized, or even made acid, with respect to litmus paper, the product would not react with the diacyl peroxide.

However, when an ethylene/vinyl acetate copolymer was hydrolyzed by an alcoholic mineral acid, such as sulfuric acid, the product reacted readily when compounded with the diacyl peroxide to produce an optically clear material.

Although the acid hydrolysis is critical, satisfactory results can be obtained using terpolymers of ethylene/vinyl acetate/vinyl alcohol with a range of compositions. As pointed out above, the vinyl acetate content of the starting ethylene/vinyl acetate copolymer can range from about 40 to about 65 weight percent, and upon partial hydrolysis in an acid medium, a satisfactory ethylene/vinyl acetate/vinyl alcohol terpolymer product is obtained when the vinyl alcohol content comprises from about 3 weight percent to about 30 weight percent of the terpolymer. At less than about 3 weight percent vinyl alcohol, the terpolymer loses important properties such as toughness and adhesiveness. At greater than about 30 weight percent vinyl alcohol there is a loss of tensile elongation and rubberiness. Thus terpolymers outside of these ranges are generally unsatisfactory. Hydrolysis of starting ethylene/vinyl acetate (E/VA) copolymers to 3 to 30 weight percent vinyl alcohol (VOH) provides the following terpolymers.

| Starting VA Content in E/VA (wt. %) | E/VA/VOH Terpolymers hydrolyzed to about | |
|---|---|---|
| | 3 wt. % VOH | 30 wt. % VOH |
| 40 | 61.5/36.0/2.5 | 74.2/1.0/24.8* |
| 45 | 56.4/41.0/2.6 | 70.1/1.0/28.9 |
| 50 | 51.3/46/2.7 | 64.4/5.5/30.1 |
| 55 | 46.2/51/2.8 | 57.9/12/30.1 |
| 60 | 41.1/56/2.9 | 51.6/18/30.4 |
| 65 | 36.0/61/3.0 | 45.1/29.5/30.4 |

*Can hydrolyze to only about 25 wt. % VOH.

A particularly advantageous terpolymer for use as an adhesive, having excellent physical properties and optical clarity, is comprised of about 55 weight percent ethylene, about 40 weight percent vinyl acetate, and about 5 weight percent vinyl alcohol.

It has been found that the ethylene/vinyl acetate/vinyl alcohol of this invention may advantageously be used as the adhesive in a glass-polycarbonate laminate. However, when the terpolymer is used as an adhesive, it undergoes cohesive failure at temperatures greater than 140°F. Importantly the upper temperature limit of the adhesive can be increased significantly by light crosslinking using from about 0.1 to about 5 weight percent diacyl peroxide. This crosslinking is only slight and may be considered more as a process for increasing the softening point of the terpolymer than for tying it together. Such crosslinking has no effect on the hydroxyl content of the terpolymer.

The terpolymer is compounded by cold blending the peroxide into the terpolymer by mechanical means, as on a rubber mill. In one embodiment, the terpolymer is compounded with from about 0.5 to 2 weight percent of a peroxide, such as benzoyl peroxide or dicumyl peroxide, on a rubber mill at room temperature. The homogenized mixture is then pressed at a temperature of about 100°C., and if curing is desired, at above about 125°C. but below the decomposition temperature of the polymer, to form a film of adhesive of the required thickness. The partially cross-linked compositions (with 0.5 to 1.0 weight percent peroxide) can be cured at this point, but the higher levels of crosslinking need to be achieved when the sheet is between the layers to be laminated.

The procedure for making the laminate is straightforward, and a number of pieces of equipment, such as an autoclave or heated hydraulic press can be used. Thus, laminates of glass-to-glass, glass-to-polycarbonate, and polycarbonate-to-polycarbonate can be made using the terpolymer of this invention by cleaning the plates to be laminated, cutting the terpolymer sheet to fit the laminate, cleaning the sheet, placing the terpolymer between the plates that are to be bonded, and heating the terpolymer adhesive (preferably under vacuum to eliminate bubbles) at a slight pressure to ensure a mechanical bond. It has been found that a laminating pressure of approximately 5–30 pounds per square inch and a laminating temperature of about 70° to 130°C. produces a satisfactory laminate depending upon the composition of the adhesive. To provide further crosslinking during laminating the higher temperature is desirable to reduce cure time.

Although the crosslinking is achieved by the diacyl peroxides, such as benzoyl peroxide, lauryl peroxide, acetyl benzoyl peroxide, propionyl peroxide and the like, benzoyl peroxide and dicumyl peroxide were found to be quite satisfactory. A number of other compounds were found to be satisfactory, such as ditertiary butyl peroxide, 2,5-dimethyl-2,5-di(t-butyl peroxy)-hexane, t-butyl perbenzoate, $\alpha,\alpha'$-bis(t-butyl peroxy) diisopropyl benzene, and azobisisobutoxonitrile.

The polycarbonate may be any suitable film of polycarbonate such as that disclosed in U.S. Pat. Nos. 3,028,365 and 3,117,019 and is preferably prepared by reacting di-(monohydroxyaryl)-alkanes with derivatives of carbonic acid such as phosgene and bischlorocarbonic acid esters of di-(monohydroxyaryl)-alkanes. An excellent description of the polycarbonates of this invention can be found in U.S. Pat. No. 3,539,442 beginning at column 4, line 34 and ending at column 6, line 19, and that description is herewith incorporated by reference.

The glass employed in this invention can be an amorphous, brittle and often transparent material comprising a fused mixture of the silicates of the alkali and alkaline earth or heavy metals. It can be regular plate glass, polished plate glass, or float glass, etc. of varying thicknesses. In addition, this invention contemplates using fully or semiheat tempered or chemically tempered glass of varying thickness. The glass may be colored or decorated.

DESCRIPTION OF THE PREFERRED EMBODIMENTS

The invention is further illustrated by, but not limited to the following examples.

EXAMPLES 1–3

This experiment demonstrates the usefulness of a terpolymer of ethylene/vinyl acetate/vinyl alcohol crosslinked with up to 1.0 weight percent benzoyl peroxide.

A batch of ethylene/vinyl acetate analyzing 47.5 weight percent vinyl acetate was acid hydrolyzed by the following procedure. To 525 grams of the copolymer dissolved in 2100 milliliters of toluene was added an ethanolic sulfuric acid solution containing 15.9 grams concentrated sulfuric acid in 375 grams ethanol. The mixture was refluxed at about 80°–82°C. for about two hours to hydrolyze a portion of the vinyl acetate. The above reaction mixture was allowed to cool to room temperature, and was then poured into about 9000 milliliters of methanol.

After the terpolymer precipitate had settled, the methanol was decanted, and the precipitate was washed with water until the washings were neutral to litmus paper. The product was dried by milling on a rubber mill for about 15 minutes at about 150°C. Analysis by saponification revealed that the terpolymer contained about 38 weight percent vinyl acetate. Final analysis showed that the terpolymer contained 55.4 weight percent ethylene, 37.9 weight percent vinyl acetate and 6.7 weight percent vinyl alcohol.

Portions of the above terpolymer were compounded with various amounts of benzoyl peroxide. About 40-gram samples of the terpolymer were milled with 0.0, 0.1 and 0.5 weight percent benzoyl peroxide on a rubber mill at room temperature. The materials were then cured in a rubber mold at 150°C. to provide a 40-mil thick thermoplastic sheet.

Laminates were prepared from glass-glass, glass-polycarbonate and polycarbonate-polycarbonate combinations bonded with the above adhesive terpolymer. These laminates consisted of five inch by five inch plates, each 0.25 inch thick. The plates to be laminated were cleaned with detergent, rinsed with clean water, and then with alcohol. The plates were then allowed to air dry. Care was taken to ensure that the surfaces to be bonded were not touched. The adhesive was cut to fit the 5 inch × 5 inch plates. The adhesive sheet was washed on both sides with alcohol and allowed to air dry. The adhesive sheet was then placed between the plates to be bonded and the unbonded laminate was wrapped with porous nylon bleeder cloth, such as Burlington Industries Style 51789, approximately 0.005 inch thick. The plates with the adhesive therebetween were then placed in a vacuum bag and layers of bleeder fabric were placed at the top and the bottom of the plates. Silicone rubber sheets were placed at the top and bottom of the laminate. The assembly was then placed in an autoclave and the structure to be laminated was heated to a temperature of 150° to 225°F., under vacuum, while maintaining a laminating pressure of approximately 30 pounds per square inch for about 45 minutes. After the temperature cycle, the laminate was removed from the autoclave and the excess adhesive was trimmed from around the edges of the laminate.

These laminates were subjected to thermal cycling wherein the laminates were first maintained for a period of at least one hour at −65°F. and then heated and maintained for a period of at least one hour at 165°F. and the cycle repeated. This thermal cycle was administered at least five times. The laminates were also subjected to a more strenuous cycle of from −65°F. to 195°F. The results are presented below:

| Example | Benzoyl Peroxide (wt. %) | Results |
|---|---|---|
| 1 | 0 | Control sample heat formable and soluble in toluene. Cohesive failure of adhesive at about 140°F. |
| 2 | 0.1 | Heat formable and insoluble in toluene. Passed 165°F. thermocycle test but failed 195°F. test. |
| 3 | 0.5 | Heat formable only with difficulty. Passed 195°F. thermocycle test. |

The optical clarity of the laminates were compared with sheets of polycarbonate and glass that had not been subjected to thermocycling. Very little, if any, difference could be determined in the optical clarity of the thermocycled laminates.

EXAMPLES 4–7

These experiments demonstrate the usefulness of the ethylene/vinyl acetate/vinyl alcohol crosslinked with from about 1.0 to about 5 weight percent benzoyl peroxide.

The ethylene/vinyl acetate/vinyl alcohol terpolymer of Examples 1–3 was compounded with from about 1.0 to about 10 weight percent benzoyl peroxide by mechanical blending at room temperature on a rubber mill to form about 40-mil thick sheet. The terpolymer crosslinked with less than about one weight percent benzoyl peroxide was thermoplastic, but levels of benzoyl peroxide at one weight percent or more formed intractable adhesives.

The terpolymer containing the homogenized benzoyl peroxide was pressed at about 190°F. to form but not crosslink the sheet. The laminates were then made by the procedure of Examples 1–3, except that the sheets were cured for about 45 minutes at 150°C. in situ. This provided laminates with about 20-mil thick adhesive layers which were subjected to the same thermocycling tests as Examples 1–3. Results of these tests are given below:

| Example | Benzoyl Peroxide (wt. %) | Results |
|---|---|---|
| 4 | 1.5 | Intractable adhesive. Laminate passed 195°F. thermocycle test. |
| 5 | 3.0 | Intractable adhesive. Laminate passed 195°F. thermocycle test. |
| 6 | 5.0 | Intractable adhesive. Laminate passed 195°F. thermocycle test. Hard rubber - upper limit of usefulness. |
| 7 | 10.0 | "Cheezy" material totally unsuitable for adhesive. |

The optical clarity of laminates using the adhesives of Examples 4–6 was excellent when compared with sheets of polycarbonate and glass that had not been subjected to thermocycling.

EXAMPLE 8

This example demonstrates the importance of using acid hydrolyzed terpolymer to crosslink with a diacyl peroxide.

To a solution of about 175 grams of an ethylene/vinyl acetate copolymer, analyzing about 47.5 weight percent vinyl acetate, in about 700 milliliters of toluene, which had been heated and stirred to effect thorough solution and to volatilize any monomer, was added about 30 milliliters of a solution containing about 3.3 grams of 85 percent potassium hydroxide in 33 milliliters each of methanol, ethanol and toluene. The mixture was refluxed at about 80° to 83°C. The reaction mixture was cooled in an ice bath and the product was poured into 600 milliliters of methanol. The resulting precipitate was washed three times with 4000 milliliters of water and analyzed. Saponification analysis revealed that the terpolymer contained 32.9 weight percent vinyl acetate, indicating that the terpolymer also contained 57.1 weight percent ethylene and 10 weight percent vinyl alcohol.

It was attempted to crosslink a 40-gram portion of the base catalyzed hydrolysis product by the technique of Examples 2-7. From 0.1 to 10 weight percent benzoyl peroxide was added, but in all cases the product was soluble in toluene, indicating that crosslinking had not occurred.

The crosslinking attempt was repeated using a fresh portion of terpolymer that had been washed with water until it was neutral to litmus paper. Again, toluene solubility tests indicated that crosslinking had not occurred when using up to 10 weight percent benzoyl peroxide.

The crosslinking attempt was tried a third time using a fresh portion of terpolymer that had been washed with dilute acid, then washed with water until it was neutral to litmus paper. Again, the toluene solubility test indicated no crosslinking using up to 10 weight percent benzoyl peroxide.

The crosslinking attempt was repeated using a fresh portion of terpolymer in solution, except that it was brought from base to neutral and to slightly acidic with concentrated sulfuric acid. The terpolymer was then precipitated, washed to neutral with water, compounded with up to 10 weight percent benzoyl peroxide, and curing attempted. Again, no curing occurred as judged by solubility in toluene and apparent lack of viscosity change. Dicumyl peroxide was also tried with the same result.

A terpolymer prepared by basic hydrolysis consisting of 53.8 weight percent ethylene, 42.9 weight percent vinyl acetate and 3.3 weight percent vinyl alcohol was also examined. Attempts to cure with the following peroxides were unsuccessful: dicumyl peroxide, di-t-butyl peroxide, 2,5-dimethyl-2,5-di(t-butylperoxy)hexane, t-butyl perbenzoate, α,α'-bis(t-butylperoxy)diisopropyl benzene and azobisisobutoxonitrile.

Thus, it can be seen that acid hydrolysis is a critical step in preparing a suitable adhesive for bonding glass and polycarbonate.

EXAMPLE 9

This example demonstrates the usefulness of dicumyl peroxide as a crosslinking agent.

Ethylene/vinyl acetate was acid hydrolyzed by the procedure of Examples 1-3 to yield a terpolymer of 56.4 weight percent ethylene, 34.9 weight percent vinyl acetate and 8.7 weight percent vinyl alcohol. The terpolymer was compounded with from about 0.1 to 5 weight percent Di-Cup R on a rubber mill to make a homogenized sheet about 40 mils thick. Di-Cup R is recrystallized dicumyl peroxide available commercially from Hercules Co., Wilmington, Del. The sheet was then pressed at about 400 pounds per square inch at about 190°F. to form about 20 mil thick sheets.

Glass-polycarbonate and polycarbonate-polycarbonate laminates were made by the procedure of Examples 4-7 since the reaction temperature of Di-Cup R is above the softening temperature of polycarbonate. Laminates were made using adhesive containing 0.1, 2, 3, 4, 5 and 10 weight percent Di-Cup, and exposed to the thermocycle tests of Examples 1-7. The laminates made with adhesive with less than 0.1 weight percent Di-Cup R showed cohesive failure after thermocycling, and products with greater than about five weight percent Di-Cup R were intractable. Laminates from about 0.1 to about five weight percent Di-Cup R in the adhesive had excellent optical clarity.

EXAMPLE 10

A glass-glass laminate is prepared according to the procedure of Examples 1-3 except that about 0.1 to about five weight percent Di-Cup R is used as the crosslinking agent, and the terpolymer homogenized with Di-Cup R is crosslinked in situ between the glass layers at 320°F. The optical clarity is excellent and the laminate successfully withstands thermocycling.

Although the invention has been described in terms of specified embodiments which are set forth in considerable detail, it should be understood that this is by way of illustration only, and that the invention is not necessarily limited thereto, since alternative embodiments and operating techniques will become apparent to those skilled in the art in view of the disclosure. Accordingly, modifications are contemplated which can be made without departing from the spirit of the described invention. For instance additional minor amounts of a comonomer may be used to make a tetrapolymer and various covulcanizing agents used to assist in crosslinking.

We claim:

1. An optically clear adhesive for glass-glass, glass-polycarbonate and polycarbonate-polycarbonate laminates which comprises an ethylene/vinyl acetate copolymer having from about 40 to about 65 weight percent vinyl acetate, said copolymer being partially hydrolyzed in a mineral acid medium to form a terpolymer having a vinyl alcohol content from about 3 to about 30 weight percent, said terpolymer being compounded and partially cross-linked with from about 0.5 to about 3.0 weight percent of a diacyl peroxide.

2. An adhesive of claim 1 wherein said acid medium comprises sulfuric acid.

* * * * *